Sept. 19, 1933.　　　J. B. MINER　　　1,927,242
GRAZING MUZZLE
Filed May 28, 1930
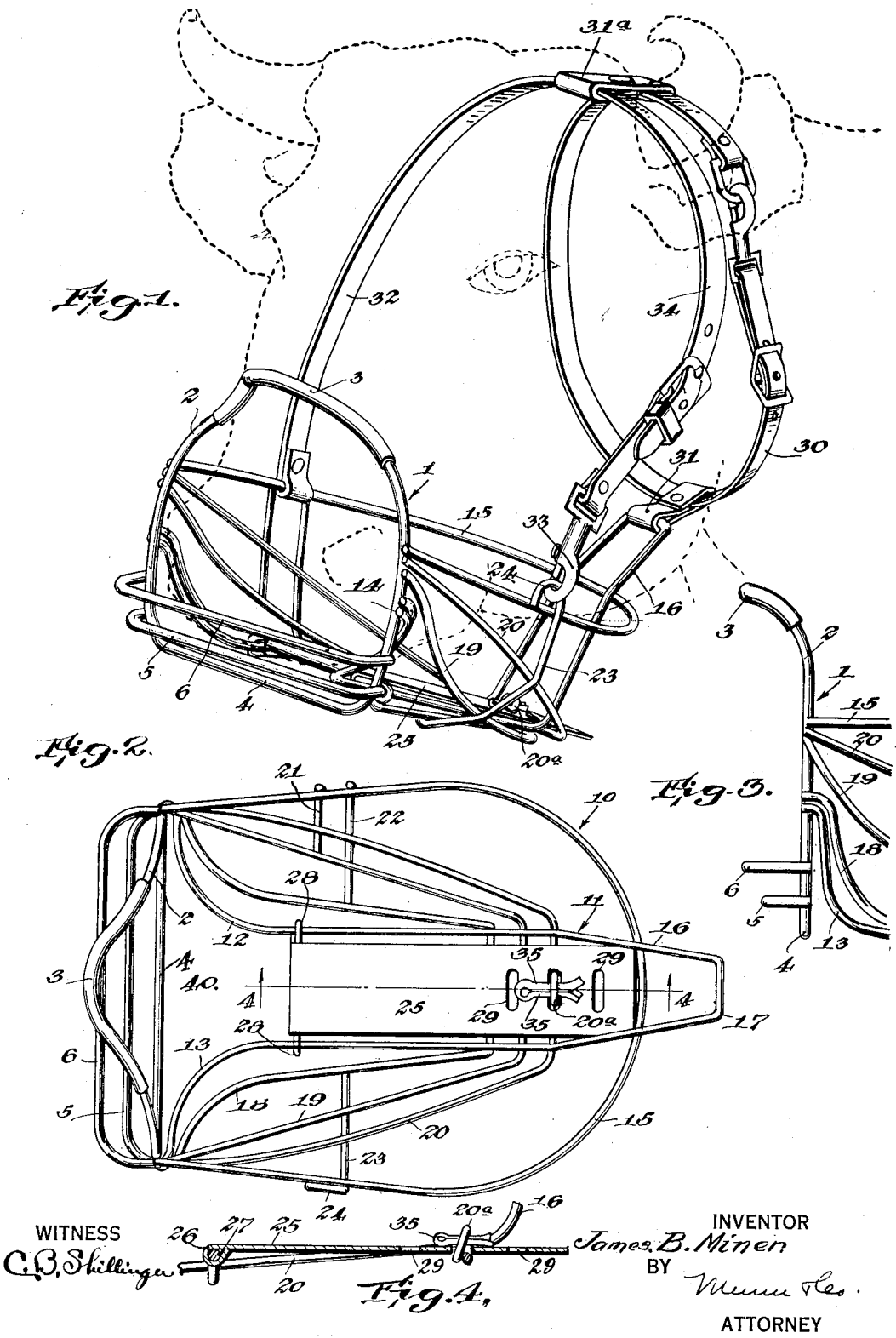

Patented Sept. 19, 1933

1,927,242

UNITED STATES PATENT OFFICE 1,927,242

GRAZING MUZZLE

James B. Miner, Portland, Oreg.

Application May 28, 1930. Serial No. 456,765

2 Claims. (Cl. 119—133)

This invention relates to grazing muzzles for stock and more particularly for cows, constructed to limit the amount of pasturage which the animal can secure during a given time.

A primary object of the invention is to so construct a muzzle of this character as to prevent the animal wearing it from overeating and from ravenous eating, both of which have a tendency to cause bloating when the pasturage is of the nature of alfalfa or new clover.

Another object of the invention is to so construct a muzzle of this character as to prevent the animal from nipping the vegetation too close to the ground such as would be likely to cause the vegetation to die.

Still another object is to construct a grazing muzzle so as to prevent the animal from eating over the nose bar and thereby further limiting the grazing activities without in any way injuring the nose, tongue or jaws of the animal.

Still another object of the invention is to so construct the nose bridge of the muzzle that it will comfortably fit the head of the animal without any tendency to cut into the flesh or to abrade the skin thereof.

In carrying out these objects, the invention is susceptible of a wide range of modification without departing from the spirit or sacrificing any of the advantages of the claimed invention; there being shown in the drawing for illustrative purposes a preferred and practical form, in which:

Figure 1 represents a perspective view showing the muzzle in applied position on the head of a cow, the latter being shown in dotted lines;

Fig. 2 is a plan view of the muzzle detached and with the attaching strap omitted;

Fig. 3 is a side elevation of the front portion of the muzzle; and

Fig. 4 is a longitudinal section taken on the line 4—4 of Fig. 2.

It is well known that cattle when turned to pasture on alfalfa or new clover eat so ravenously that bloating and often times death is the result thereof. It is therefore important that animals so pastured be prevented from over eating and from too rapid eating and it is to accomplish this result that this grazing muzzle is designed. To accomplish this result it is necessary that the relative movement of the jaws of the grazing animal be limited so that the animal is required to eat slowly and will thereby obtain a quantity sufficient only to produce desired results, that is, to nourish and fatten the animal and produce milk making material, thus avoiding bloating incident to rapid eating of the grasses mentioned.

The muzzle embodying this invention comprises a nose loop 1 the upper bar 2 of which is bowed outwardly intermediate its ends as shown at 3 to adapt it to fit comfortably over the animal's muzzle and this bar at this bowed or muzzle engaging portion is preferably covered with rubber tubing to prevent cutting of the wire, from which the muzzle is formed, into the flesh of the animal, or the abrasion of the skin of the animal. The lower bar 4 of the nose loop is substantially straight or flattened with its ends curved sufficiently so as to adapt the bar to operate to prevent the animal from nipping the grass more than two inches or so from the ground, thereby avoiding all possibility of the killing out of the grass incident to the too close grazing thereof.

Arranged above the bottom bar 4 of the loop 1 and connected with the side members thereof are cross bars 5 and 6 arranged one above the other and one in advance of the other, the lower bar 5 being spaced inwardly in relation to bar 6 and outwardly in relation to bar 4. This arrangement of cross bars prevents the animal from eating over the lower member 4 of the nose loop.

The nose loop 1 with its cross bars 5 and 6 is provided at its lower end with a jaw guard shown in the form of a substantially shovel-shaped wire frame. The bottom of the wire frame includes a substantially A-shaped wire member 11 arranged in a plane midway of the frame 10 with the front ends of its arms curved outwardly and upwardly as shown at 12 and 13 and secured by welding or otherwise to the side members of the nose loop as shown at 14. The upper member of the frame 10 is in the form of a U-shaped wire 15 adapted to extend under the lower jaw of the animal at the rear thereof as shown clearly in Fig. 1 and is secured at its front ends to the side members of the nose loop near the upper portion thereof. To the rear end of this U-shaped wire 15 is secured by welding or soldering the loop portion 16 of the member 11 which is bent intermediate its length and extended upwardly and outwardly beyond the curved portion of the member 15, the extension 17 thereof forming a loop for engagement by a strap 31 which connects the muzzle with the throat strap 30 of the attaching mechanism. This U-shaped member 15 constitutes the upper guard member of the frame 10 and the bottom of the frame further includes three substantially U-shaped wire members numbered 18, 19 and 20, respectively, and which are welded or otherwise secured to the flat portion of the member 11 at their looped ends while their front ends extend upwardly and are arranged one above the other and welded or otherwise secured to the side members of the nose loop 1. It will thus be seen that these wire members 11, 18, 19 and 20 constitute the bottom and the sides of the frame 10 and at said sides are reinforced and tensioned by cross wires 21 and 22 at one side of the frame and 23 at the other side, the wires 21 and 22 are spaced apart at their upper ends where they are connected with the upper guard wire 15 a sufficient distance to receive between them one of the cheek straps 32 of the attaching mechanism. The upper end of the cross wire 23 is looped and extended above the guard wire 15 and is designed to receive a snap hook 33 carried by the other cheek strap 34. The loop with which the snap hook 33 is engaged is numbered 24.

A lower jaw engaging plate 25 is arranged to slide longitudinally on the parallel arm portions of the member 11 being provided at its front end with a transversely extending sleeve-like portion 26 in which is mounted a guide wire 27 having loops 28 at its ends which slidably engage the side wires of the member 11. The rear end of the rest plate 25 overlies the loop portions of the bottom members 18, 19 and 20 and is provided with a plurality of transversely extending slots 29 to selectively receive a loop 20ᵃ extending upwardly from the rear end of the wire 20 and by means of which the plate 25 is adjustably secured in place and held by a cotter pin 35. It will thus be seen that the plate 25 may be adjusted toward or away from the nose engaging bars of the frame 10 to vary the size of the opening 40 through which the grass may be eaten. It will thus be seen that the animal is permitted to open its jaws wide enough to admit a moderate quantity of vegetation to be eaten through this space 40, but the engagement of the guard 15 with the lower jaw of the animal and of the upper portion 3 of the nose loop with the upper side of the muzzle of the animal prevents the animal from opening its mouth wide enough to take in more than a moderate quantity of grass.

This muzzle may be constructed of any suitable heavy wire preferably of copper wire and it is of course attached to the head of the animal by suitable straps which form a halter, these straps being here shown in the form of cheek straps 32 and 34 with a throat strap 30 which latter is connected with the former by short loop-like straps 31 and 31ᵃ. These straps are provided with suitable buckles for adjusting the halter to suit heads of different sizes and suitable snap hooks for connecting the parts.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. A live stock muzzle comprising a nose encircling loop, a lower jaw guard carried by said loop and adapted to extend up and around the lower jaw of the animal when applied, an opening at the front end of said guard through which the animal may graze, a member for adjusting the size of the grazing opening comprising a plate having loops slidably engaged with the lower jaw guard and provided with a plurality of longitudinally spaced openings, a loop extending upwardly from the rear portion of the bottom of said guard, and adapted to be passed through one of said openings to hold the plate in adjusted position, means to be extended through said loop to prevent separation of the parts, and means for suspending the muzzle from the head of the animal.

2. A live stock muzzle comprising a nose encircling loop, a lower jaw guard carried by said loop and adapted to extend up and around the lower jaw of the animal when applied, an opening at the front end of said guard through which the animal may graze, a member for adjusting the size of the grazing opening, said member having loops slidably engaged with the lower jaw guard and being provided with a plurality of longitudinally spaced openings, a loop extending upwardly from the rear portion of the bottom of said guard, to be passed through one of said openings to hold the member in adjusted position, means to be extended through said loop to prevent separation of the parts, and means for suspending the muzzle from the head of the animal.

JAMES B. MINER.